US010470233B2

(12) United States Patent
Bergquist et al.

(10) Patent No.: US 10,470,233 B2
(45) Date of Patent: Nov. 5, 2019

(54) RLC DELIVERY FAILURE RESOLUTION

(71) Applicant: Telefonaktiebolaget LM Ericsson (publ), Stockholm (SE)

(72) Inventors: Gunnar Bergquist, Kista (SE); Carola Faronius, Jarfalla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 339 days.

(21) Appl. No.: 15/326,467

(22) PCT Filed: Oct. 1, 2014

(86) PCT No.: PCT/EP2014/071067
§ 371 (c)(1),
(2) Date: Jan. 13, 2017

(87) PCT Pub. No.: WO2016/050296
PCT Pub. Date: Apr. 7, 2016

(65) Prior Publication Data
US 2017/0207883 A1    Jul. 20, 2017

(51) Int. Cl.
*H03M 13/00* (2006.01)
*H04W 76/19* (2018.01)
(Continued)

(52) U.S. Cl.
CPC ............. *H04W 76/19* (2018.02); *H04L 1/08* (2013.01); *H04L 47/34* (2013.01); *H04W 24/10* (2013.01); *H04W 36/38* (2013.01); *H04W 72/042* (2013.01)

(58) Field of Classification Search
CPC ......... H04L 1/08; H04L 47/34; H04L 1/1809; H04L 1/1896; H04L 1/1864;
(Continued)

(56) References Cited

U.S. PATENT DOCUMENTS

2007/0171857 A1* 7/2007 Wang ............... H04L 1/1867
370/328
2009/0190480 A1* 7/2009 Sammour .......... H04L 1/1848
370/242
(Continued)

FOREIGN PATENT DOCUMENTS

WO    2009055414 A2    4/2009
WO    2014025755 A1    2/2014

OTHER PUBLICATIONS

International Search Report and Written Opinion, Application No. PCT/EP2014/071067, dated May 28, 2015, 9 pages.
(Continued)

*Primary Examiner* — Guerrier Merant
(74) *Attorney, Agent, or Firm* — Patent Portfolio Builders, PLLC

(57) ABSTRACT

A method in a first node of a telecommunications network, in which a Radio Link Control (RLC) controller detects a failure to transmit a first RLC data Protocol Data Unit (PDU) containing all or part of a Service Data Unit (SDU) towards a second node of the telecommunications network, and notifies a Radio Access Control (RAC) controller of the failure. The RAC controller, in response to receiving a dedicated control channel (DCCH) message from the second node subsequent to the notification, instructs the RLC controller to retransmit the SDU. In response to the instruction, the RLC controller transmits a second RLC data PDU containing the SDU or a part of the SDU towards the second node. The RLC controller, in further response to the instruction, transmits a receipt of delivery to the RAC controller when reception of all parts of the SDU has been positively acknowledged by the second node.

20 Claims, 3 Drawing Sheets

(51) Int. Cl.
*H04L 1/08* (2006.01)
*H04L 12/801* (2013.01)
*H04W 24/10* (2009.01)
*H04W 36/38* (2009.01)
*H04W 72/04* (2009.01)

(58) Field of Classification Search
CPC ......... H04L 2001/0097; H04L 1/1848; H04W 76/19; H04W 36/38; H04W 72/042; H04W 24/10; H04W 72/04; H04W 76/28; H04W 76/15; H04W 76/34
See application file for complete search history.

(56) References Cited

U.S. PATENT DOCUMENTS

| | | | |
|---|---|---|---|
| 2013/0170496 A1* | 7/2013 | Kim ...................... | H04L 1/1867 370/394 |
| 2016/0142184 A1* | 5/2016 | Yi ........................... | H04L 1/08 714/748 |
| 2016/0142939 A1* | 5/2016 | Yi ........................ | H04W 74/06 370/329 |

OTHER PUBLICATIONS

Office Action issued in application No. 14780470.2; dated Jan. 12, 2018; 05 pages.
Office Action issued in application No. 14780470.2; dated May 31, 2018; 04 pages.
Office Action issued in application No. 14780470.2; dated Nov. 13, 2018; 04 pages.

* cited by examiner

RLC DELIVERY FAILURE RESOLUTION

CROSS-REFERENCE TO RELATED APPLICATIONS

This application is a National stage of International Application No. PCT/EP2014/071067, filed Oct. 1, 2014, which is hereby incorporated by reference.

TECHNICAL FIELD

The present invention relates to Radio Link Control, RLC. In particular, the invention relates to a method and apparatus for resolving delivery failures in an RLC system.

BACKGROUND

Radio Resource Control (RRC) transaction failures are common in commercial telecommunications networks, e.g. Long Term Evolution (LTE) networks. Such failures have a significant impact on the customer's perception of signal quality, as even if the transaction is recovered, the delay due to the recovery process will often be large enough to affect quality of service.

RRC transactions use Radio Link Control Acknowledged Mode (RLC AM) to deliver on the data layer. An RLC entity receives/delivers RLC Service Data Units (SDUs) from/to upper layers and sends/receives RLC protocol Data Units (PDUs) to/from its peer RLC entity via lower layers. Each sent PDU is assigned a Sequence Number (SN). The SN is used to allow the receiver to provide the transmitted data in the correct order, even if certain packets are received out of sequence. In the event that the receiver detects a gap in the sequence, it can send an RLC STATUS PDU to the transmitter requesting retransmission of the missing data PDU. Additionally, the transmitter may poll the receiver in order to trigger status reporting, and in response the receiver will send an RLC STATUS PDU indicating any gaps in the received sequence numbers, the sequence numbers of any partially received PDUs, and/or the next expected sequence number (which is an implicit acknowledgement of all PDUs with lower sequence numbers).

The transmitter will generally poll for updates whenever it would be unable to send an RLC data PDU following the PDU currently being transmitted, e.g. if both the transmission buffer and retransmission buffer are empty, or if the next sequence number to be transmitted would fall outside of the transmitting window. The transmitting window is defined by two variables, VT(A), which is the lowest sequence number of the sent PDUs that remains to be acknowledged, and VT(MS), which is VT(A) plus the size of the transmitting window. The SN of the next PDU to be sent is assigned to the variable VT(S), and a PDU may only be sent if $VT(A) \leq VT(S) < VT(MS)$.

Whenever a PDU is transmitted from the RLC transmitter, a copy of the PDU will be saved in the retransmission buffer. PDUs for which reception has been acknowledged by the receiver will be removed from the retransmission buffer. In the event that the transmitter receives a STATUS PDU indicating that a PDU was not received, or only partially received, the transmitter will retransmit the PDU or segment of the PDU ('resegmentation' as set out in 3GPP TS 36.322). The PDU or segment of PDU that is retransmitted will remain in the retransmission buffer for as long as it is not acknowledged. A counter is incremented for each retransmission attempt, and if the counter exceeds a threshold, then the transmission is reported as failed to a higher protocol layer. Such a complete failure will generally occur 0.5-2.5 s from initial transmission depending on the configuration of the RLC transmitter.

Such failures can be particularly problematic during user equipment (UE) connection reconfigurations such as those relating to handover. These particular transactions often stall due to temporary radio outages on the downlink (DL) connection to the UE. In the case of handover, the process is initiated by the UE sending a measurement report, following which the eNodeB chooses to initiate handover if the UE would receive better service on another eNodeB, or for load balancing purposes. If an RLC delivery failure is experienced for a handover command sent to the UE, the Radio Access Control (RAC) will wait for an attempt by the UE to re-establish the connection. However, there is still a serious interruption to services for the UE, which can cause ongoing sessions to fail.

The UE will remain in the source cell, and continue sending measurement reports, but the RAC controller in the source eNodeB will not react (as it considers the connection with the UE to be in the process of being handed over). This situation will continue until a handover timeout expires in the RAC controller of the eNodeB (generally around 10s from the start of handover), or the UE triggers a Radio Link Failure (RLF) due to an uplink (UL) RLC failure. It is not desirable for the RAC to order retransmission of the handover command following notification of failure by the RLC. If the later handover command is received, its data will necessarily be processed by RLC with a higher sequence number than that of the previous handover command, which would cause the RLC layer in the UE to request the data corresponding to the previous handover command to be resent before delivering the data of the later command. The RLC layer will make sure of in-sequence-delivery, thus making sure the commands arrive at the RRC layer in the order that they were sent. This would result in the UE first making a handover from the source cell to the destination cell, and then making a second handover within the destination cell (i.e. from the destination cell to the destination cell).

Any solution in which the eNodeB releases the UE after a timer, or after the UE triggers an RLF, will significantly impact service quality as the UE will have no service during the timer or until the RLF is triggered. The time required could cause sessions to time out, e.g. ending voice calls or video streams. Reducing the time between consecutive retransmissions would increase the load on the downlink in the event of a permanent radio outage, and would risk terminating the handover process in cases where the connection is degraded but not completely lost.

The RLC failures are often due to short interruptions in the downlink connection, due to brief periods where the radio signal is weakened due to obstruction or interference. Therefore, one possible solution would be to simply increase the number of retransmission attempts of an RLC PDU. However, this would also increase the load on the downlink connection, and cause a general drop in quality of service, as the retransmission attempts would each take up downlink bandwidth. Alternatively, the time between retransmissions could be increased, but this would decrease the initial redundancy in the connection, and cause very short outages to have more significant effects. Other solutions with e.g. dynamic timing of the RLC polls may be proposed, but all such solutions share the problem that they are internal to the RLC layer, and therefore unaware of details which may be known to higher layers, therefore may be sending wasteful retransmissions.

SUMMARY

According to a first aspect of the present invention there is provided a method in a first node of a telecommunications network, the method comprising, in a Radio Link Control, RLC, controller of the first node, detecting (S101) a failure to transmit a first RLC data Protocol Data Unit, PDU, containing all or part of a Service Data Unit, SDU, towards a second node of the telecommunications network, and notifying (S102) a Radio Access Control, RAC, controller of the first node of the failure. Then, in the RAC controller of the first node, in response to receiving a dedicated control channel, DCCH, message from the second node subsequent to said notification, instructing (S104) the RLC controller to retransmit the SDU. Then, in the RLC controller of the first node, in response to the instruction, transmitting (S105) a second RLC data PDU containing the SDU or a part of the SDU towards the second node. Then, in the RLC controller of the first node, in further response to the instruction, transmitting (S106) a receipt of delivery to the RAC controller when reception of all parts of the SDU has been positively acknowledged by the second node.

The step of transmitting the second RLC data PDU(s) may comprise setting a sequence number, SN, of the second RLC data PDU equal to a sequence number of the first RLC data PDU.

The invention is applicable, for example, to the case where the first node is a basestation or eNodeB and the second node is a user equipment, UE. The SDU may contain a UE reconfiguration command, e.g. a UE handover command. The DCCH message may contain a measurement report.

The telecommunications network may be one of a Long Term Evolution, LTE, network and a 3G network.

According to a second aspect of the present invention there is provided a apparatus configured to operate as a first node in a telecommunications network, the apparatus comprising a transceiver (330), a Radio Link Control, RLC controller (310), and a Radio Access Control, RAC, controller (320). The transceiver (330) is configured to communicate with a second node of the telecommunications network, and the RLC controller (310) is configured to detect a failure to transmit a first RLC data Protocol Data Unit, PDU, containing all or part of a Service Data Unit, SDU, towards the second node of the telecommunications network, and to notify the RAC controller (320) of the first node of the failure. The RAC controller (320) is further configured to, in response to receiving a dedicated control channel, DCCH, message from the second node subsequent to said notification, instruct the RLC controller (310) to retransmit the SDU. The RLC controller (310) is further configured to, in response to the instruction, cause the transceiver to transmit a second RLC data PDU containing the SDU or the part of the SDU towards the second node. The RLC controller (310) is further configured to, also in response to the instruction, transmit a receipt of delivery to the RAC controller (320) when reception of all parts of the SDU has been positively acknowledged by the second node.

The RLC controller may be configured to set a sequence number, SN, of the second RLC data PDU equal to an SN of the first RLC data PDU. The apparatus may be configured to operate as a basestation or eNodeB. In this case the SDU may contain a UE reconfiguration command, e.g. a handover command.

The DCCH, message may contain a measurement report.

According to a third aspect of the present invention there is provided a computer program comprising computer readable code which when run on an apparatus causes the apparatus to perform a method according to the above first aspect of the invention.

DETAILED DESCRIPTION

A solution is proposed here to allow for improved resolution of the failures described above. The principle behind the proposed method is to provide event based retransmission, i.e. allowing the RAC layer of the transmitter to cause the RLC layer to retransmit a failed PDU based on events at the RAC layer. Such a retransmission scheme allows recovery from brief disturbances without invoking lengthy connection re-establishment procedures, and with lower risk of sending unneeded retransmissions. Examples will be provided with reference to messages sent from an eNodeB (or basestation) to a UE, but the skilled person will appreciate that the principles described are equally applicable to transmissions from a UE to an eNodeB, or between any other pair of nodes using RLC.

Figure 1:
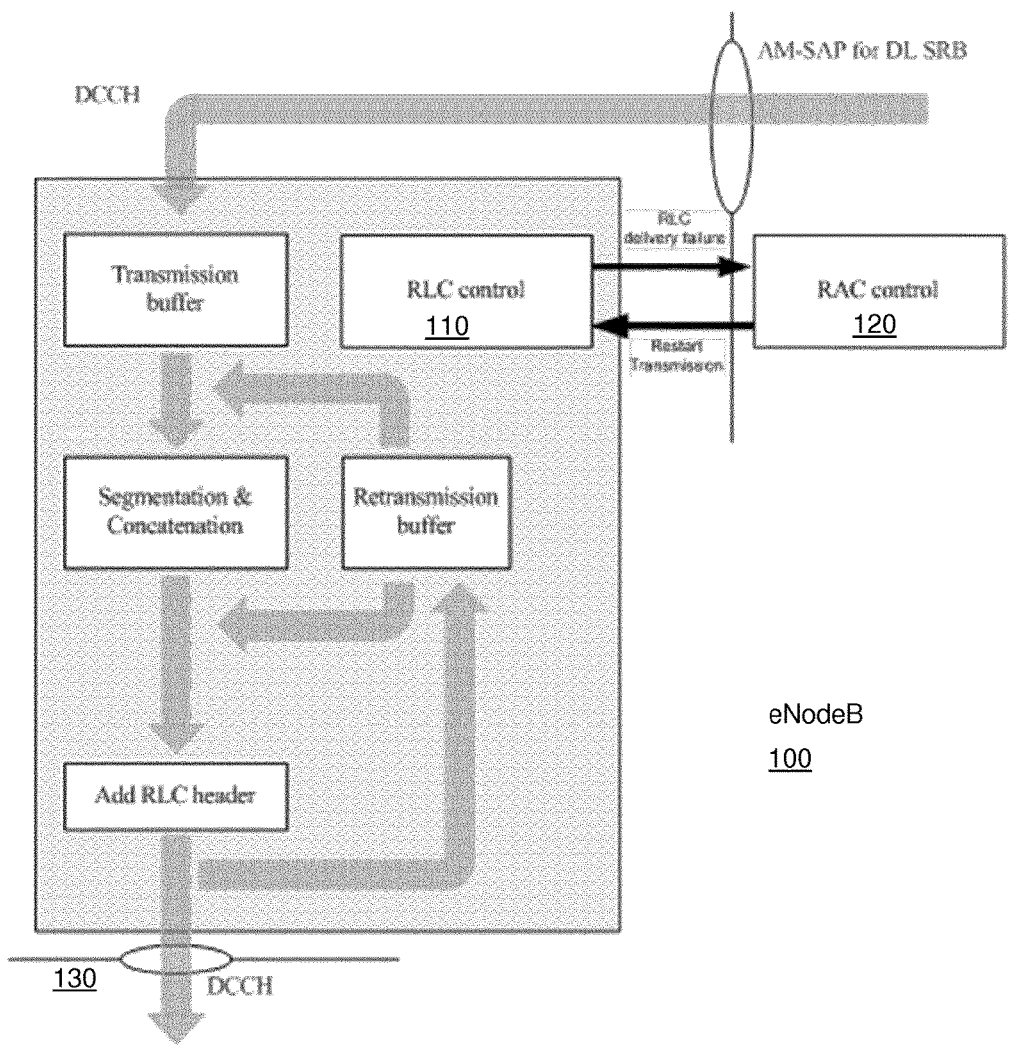
FIG. 1 is a schematic diagram of a basestation or eNodeB.
Figure 2:
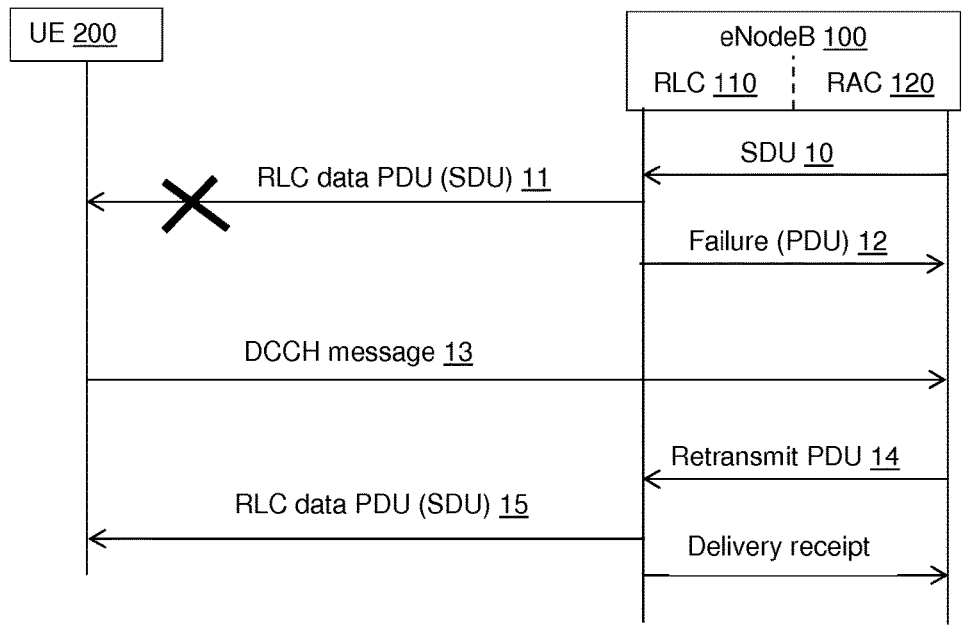
FIG. 2 is a signalling diagram according to an embodiment.

The methods will be described with reference to the eNodeB 100 schematically illustrated in FIG. 1, and the signalling diagram shown in FIG. 2. The eNodeB 100 comprises an RLC controller 110, an RAC controller 120 and a transceiver 130. The RLC controller manages a transmission buffer, a retransmission buffer, a segmentation and concatenation unit, and an RLC header unit. The skilled person will appreciate that while signals are shown being transferred from the RLC 110 to the RAC 120 within the eNodeB 100, these signals represent instructions within the eNodeB 100.

The RLC controller receives an SDU to be sent to the UE 200 (10). This SDU is stored in the transmission buffer until a signalling slot is available on the downlink, at which point it is passed to the segmentation and concatenation unit and transferred into one or more PDUs. The RLC header unit adds a header to each PDU, the header containing a sequence number, and the PDUs are transmitted (11). The PDUs are then stored in the retransmission buffer.

Each PDU may be retransmitted a certain number of times according to the configuration of the RLC controller, after which the RLC controller will report a transmission failure to the RAC controller (12). Once the transmission failure is reported, the PDU remains in the retransmission buffer. The PDU will not be considered for retransmission as the RETX_COUNT of the PDU will be above (or equal to) a threshold value. A second flag may be set in order to prevent further reports to the RAC controller. Alternatively, a separate buffer may be provided for PDUs for which a failure has occurred.

Following notification of a transmission failure, if the RAC controller receives a dedicated control channel, DCCH, message from the UE (13), it will instruct the RLC controller to retransmit the failed PDU (14). The RLC controller will, upon receipt of the instruction from the RAC control, queue the failed PDU for retransmission (15). This may be accomplished by setting the RETX_COUNT of the PDU below the threshold for retransmission, or by setting a flag on the PDU to allow retransmission despite being above (or possibly equal to) the threshold. The PDU may only be retransmitted one further time in the event that it is not acknowledged by the UE, or retransmissions may be allowed as if it were a newly transmitted PDU. The PDU may be handled in all respects like a newly transmitted PDU, except that it is not assigned a new sequence number, to ensure that no sequence number gaps occurs in the receiver.

The skilled person will note that the DCCH message from the UE would be received via RLC. However, the RLC layer is not aware of the contents of the message, and it is preferred to make the decision to retransmit in the RAC layer in order to ensure that retransmission happens when the connection is likely to have been restored (i.e. when an entire message can be sent successfully by the UE)

As discussed above, this solution is particularly applicable in the case of failure to send a handover command or UE reconfiguration command. In the case of a handover command, the RAC controller may be configured to instruct the RLC controller to retransmit the failed PDU in response to a measurement report received from the UE.

Figure 3:
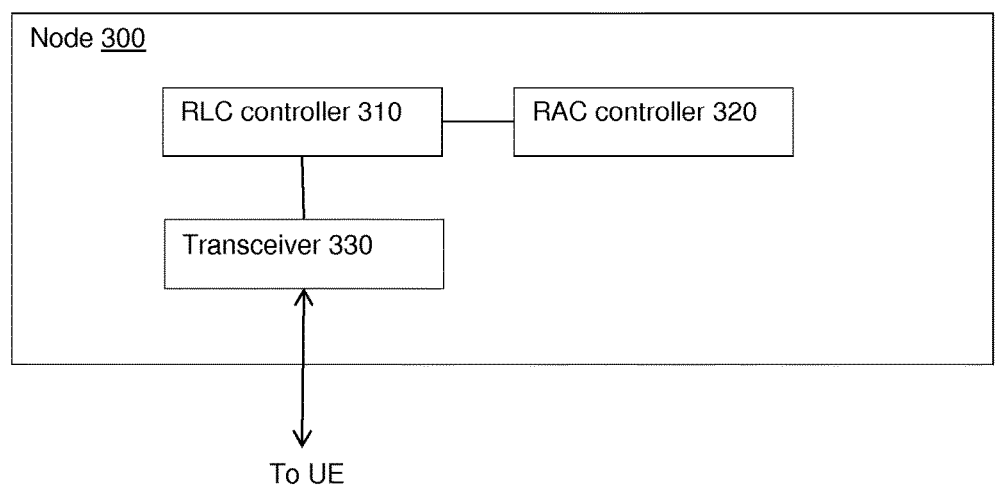
FIG. 3 is a schematic diagram of a node in a telecommunications network.

FIG. 3 is a schematic diagram of a node 300 in a telecommunications network. The node comprises an RLC controller 310, an RAC controller 320, and a transceiver 330. The transceiver 330 is configured to communicate with a second node of the telecommunications network. The RLC controller is configured to detect a failure to transmit a first RLC data PDU containing all or part of an SDU towards the second node, and to notify the RAC controller of the failure. The RAC controller is configured to, in response to receiving a DCCH message from the second node subsequent to the notification, instruct the RLC controller to retransmit the SDU. The RLC controller is further configured to, in response to the instruction, cause the transceiver to transmit a second RLC data PDU containing the SDU or the part of the SDU towards the second node. The SDU or portion of SDU in the second RLC data PDU may or may not be different to the SDU or portion of SDU in the first RLC data PDU, but the first and second PDU will have the same sequence number. The RLC controller is further configured to, also in response of the instruction, send a receipt of delivery to the RAC controller when all RLC PDU (or portions of RLC PDUs that contains parts of the SDU) have been positively acknowledged by the second node.

Figure 4:
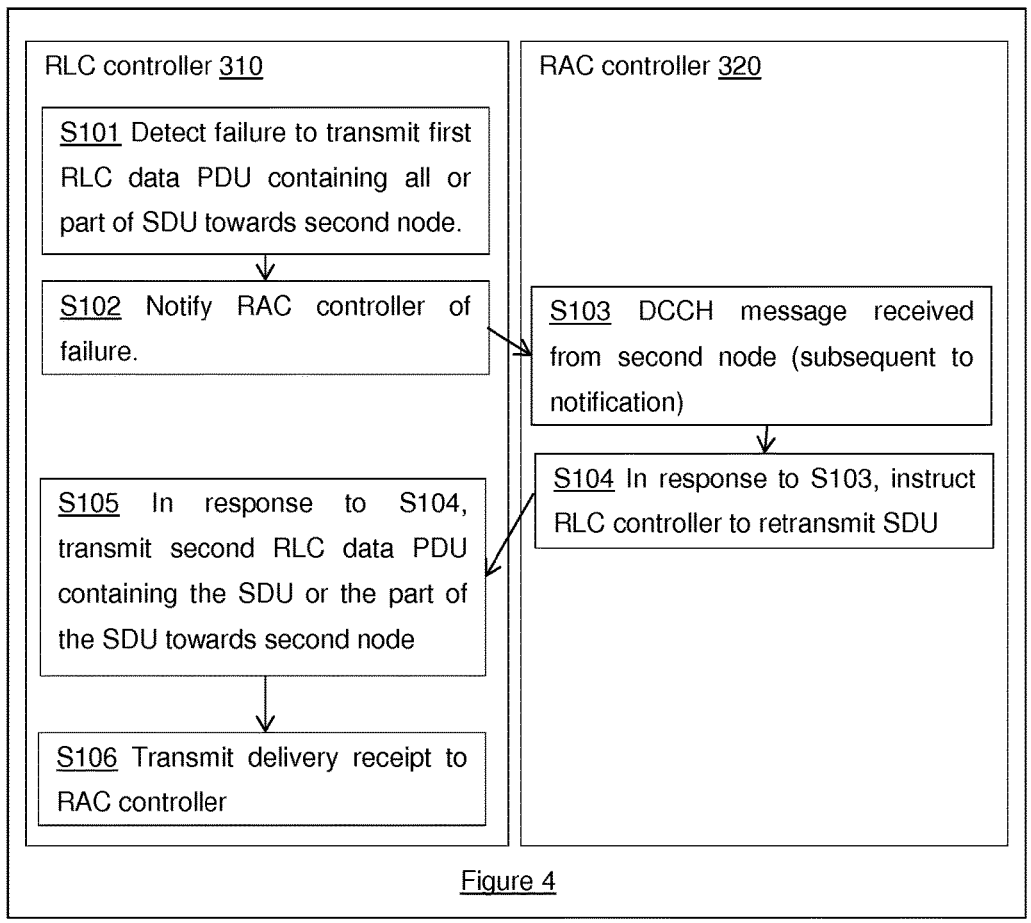
FIG. 4 is a flowchart according to a further embodiment.

FIG. 4 is a flowchart showing a method in a node of a telecommunications network comprising an RLC controller 310 and an RAC controller 320. The RAC controller 310 detects a failure to transmit an RLC data PDU containing all or part of an SDU towards a second node (S101), and notifies the RAC controller of the failure (S102).

Subsequent to the notification, the RAC controller receives a DCCH message from the second node (S103). In response to receiving the DCCH message, the RAC controller instructs the RLC controller to retransmit the SDU (S104). In response to the instruction, the RLC controller transmits a second RLC data PDU containing the SDU or the part of the SDU towards the second node. Further, also in response to the instruction, the RLC controller sends (S106) a receipt of delivery to the RAC controller, when all RLC PDU or portions of RLC PDUs that contains parts of the SDU, have been positively acknowledged by the second node.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method in a first node of a telecommunications network, the method comprising:
   in a Radio Link Control (RLC) controller of the first node:
      attempting to transmit a plurality of RLC data Protocol Data Units (PDUs), each containing a respective part of a Service Data Unit (SDU), towards a second node of the telecommunications network;
      detecting a failure to transmit a first RLC data PDU of the plurality of RLC data PDUs; and
      notifying a Radio Access Control (RAC) controller of the first node of the failure;
   in the RAC controller of the first node:
      in response to receiving a dedicated control channel (DCCH) message from the second node subsequent to said notification, instructing the RLC controller to retransmit the SDU;
   in the RLC controller of the first node:
      in response to the instruction, transmitting a second RLC data PDU containing the part of the SDU contained within the first RLC data PDU towards the second node, wherein transmitting the second RLC data PDU comprises setting a flag on the second RLC data PDU to allow retransmission of the first RLC data PDU when a count of retransmission of the first RLC data PDU is above or equal to a threshold; and
      in further response to the instruction, transmitting a receipt of delivery to the RAC controller when reception of all parts of the SDU has been positively acknowledged by the second node.

2. The method according to claim 1, wherein transmitting the second RLC data PDU further comprises setting a sequence number (SN) of the second RLC data PDU equal to a sequence number of the first RLC data PDU.

3. The method according to claim 1, wherein the first node is a base station or an eNodeB and the second node is a user equipment (UE).

4. The method according to claim 3, wherein the SDU contains a UE reconfiguration command.

5. The method according to claim 4, wherein the SDU contains a UE handover command.

6. The method according to claim 3, wherein the DCCH message contains a measurement report.

7. The method according to claim 1, wherein the telecommunications network is:
   a Long Term Evolution (LTE) network; or
   a 3G network.

8. An apparatus configured to operate as a first node of a telecommunications network, the apparatus comprising:
   a Radio Access Control (RAC) controller;
   a transceiver configured to communicate with a second node of the telecommunications network; and
   a Radio Link Control (RLC) controller configured to: attempt to transmit a plurality of RLC data Protocol Data Units (PDUs), each containing a respective part of a Service Data Unit (SDU) towards the second node of the telecommunications network, detect a failure to transmit a first RLC data PDU of the plurality of RLC data PDUs, and notify the RAC controller of the first node of the failure, wherein the RAC controller is configured to, in response to reception of a dedicated control channel (DCCH) message from the second node subsequent to said notification, instruct the RLC controller to retransmit the SDU, wherein the RLC controller is further configured to:

in response to the instruction, cause the transceiver to transmit a second RLC data PDU, containing the part of the SDU contained within the first RLC data PDU, towards the second node, and wherein, to transmit the second RLC data PDU, the RLC controller is configured to cause the transceiver to set a flag on the second RLC data PDU to allow retransmission of the first RLC data PDU when a count of retransmission of the first RLC data PDU is above or equal to a threshold; and in response to the instruction, transmit a receipt of delivery to the RAC controller when reception of all parts of the SDU has been positively acknowledged by the second node.

9. The apparatus according to claim 8, wherein the RLC controller is further configured to set a sequence number (SN) of the second RLC data PDU equal to an SN of the first RLC data PDU.

10. The apparatus according to claim 8, wherein the apparatus is configured to operate as a base station or an eNodeB.

11. The apparatus according to claim 10, wherein the SDU contains a user equipment (UE) reconfiguration command.

12. The apparatus according to claim 11, wherein the SDU contains a handover command.

13. The apparatus according to claim 10, wherein the DCCH message contains a measurement report.

14. A non-transitory computer readable storage medium that stores program code which when run on an apparatus causes a first node of a telecommunications network to perform operations comprising:

attempting, in a Radio Link Control (RLC) controller of the first node, to transmit a plurality of RLC data Protocol Data Units (PDUs), each containing a respective part of a Service Data Unit (SDU), towards a second node of the telecommunications network;

detecting, in the RLC controller of the first node, a failure to transmit a first RLC data PDU of the plurality of RLC data PDUs;

notifying a Radio Access Control (RAC) controller of the first node of the failure;

instructing, in the RAC controller, for the RLC controller to retransmit the SDU, in response to receiving a dedicated control channel (DCCH) message from the second node subsequent to said notification in the RAC controller of the first node;

transmitting a second RLC data PDU containing the part of the SDU contained within the first RLC data PDU towards the second node in response to the instruction wherein transmitting the second RLC data PDU comprises setting a flag on the second RLC data PDU to allow retransmission of the first RLC data PDU when a count of retransmission of the first RLC data PDU is above or equal to a threshold; and transmitting from the RLC controller, further in response to the instruction, a receipt of delivery to the RAC controller when reception of all parts of the SDU has been positively acknowledged by the second node.

15. The non-transitory computer readable storage medium of claim 14, wherein the program code which when run on the apparatus, further causes the first node to perform operations comprising transmitting the second RLC data PDU by setting a sequence number (SN) of the second RLC data PDU equal to a sequence number of the first RLC data PDU.

16. The non-transitory computer readable storage medium of claim 14, wherein the program code which, when run on the apparatus, causes the first node to perform operations where the first node is a base station or an eNodeB and the second node is a user equipment (UE).

17. The non-transitory computer readable storage medium of claim 16, wherein the program code which, when run on the apparatus, causes the first node to perform operations where the SDU contains a UE reconfiguration command.

18. The non-transitory computer readable storage medium of claim 17, wherein the program code which, when run on the apparatus, causes the first node to perform operations where the SDU contains a UE handover command.

19. The non-transitory computer readable storage medium of claim 16, wherein the program code which, when run on the apparatus, causes the first node to perform operations where the DCCH message contains a measurement report.

20. The non-transitory computer readable storage medium of claim 14, wherein the program code which, when run on the apparatus, causes the first node to perform operations in the telecommunications network that is a Long Term Evolution (LTE) network or a 3G network.

* * * * *